US012641694B2

(12) United States Patent
Zhou et al.

(10) Patent No.: US 12,641,694 B2
(45) Date of Patent: May 26, 2026

(54) FAST PWM DIMMING APPARATUS AND CONTROL METHOD

(71) Applicant: LEN TECH Inc., Plano, TX (US)

(72) Inventors: Jian Zhou, Plano, TX (US); Hui Xie, Shanghai (CN)

(73) Assignee: LEN TECH Inc., Plano, TX (US)

( * ) Notice: Subject to any disclaimer, the term of this patent is extended or adjusted under 35 U.S.C. 154(b) by 49 days.

(21) Appl. No.: 18/645,338

(22) Filed: Apr. 24, 2024

(65) Prior Publication Data

US 2025/0338371 A1 Oct. 30, 2025

(51) Int. Cl.

| | |
|---|---|
| ***H05B 45/325*** | (2020.01) |
| ***H05B 45/14*** | (2020.01) |
| ***H05B 45/375*** | (2020.01) |
| ***H05B 45/39*** | (2020.01) |

(52) U.S. Cl.

CPC ........... *H05B 45/325* (2020.01); *H05B 45/14* (2020.01); *H05B 45/375* (2020.01); *H05B 45/39* (2020.01)

(58) Field of Classification Search

CPC ..... H05B 45/325; H05B 45/14; H05B 45/375

See application file for complete search history.

(56) References Cited

U.S. PATENT DOCUMENTS

2022/0330403 A1* 10/2022 Kanemitsu ........... H05B 45/345
2023/0268837 A1* 8/2023 Yang ................... H02M 3/1582 323/271
2023/0353049 A1* 11/2023 Zhang ..................... H02M 3/07

* cited by examiner

*Primary Examiner* — Patrick C Chen
(74) *Attorney, Agent, or Firm* — AP3 Law Firm PLLC

(57) ABSTRACT

An apparatus includes an on timer configured to determine an on time of a high-side switch of a step-down power converter, an offset current control stage configured to convert a voltage difference between a compensation signal and a predetermined reference into a current difference, a current comparison stage configured to amplify a sensed current signal, and a PWM comparator having inputs coupled to two outputs of the current comparison stage and two outputs of the offset current control stage, wherein during a load transient from a first load level to a second load level and in a first turn-on pulse of the high-side switch, the on timer is disabled so that a current flowing through the step-down power converter reaches the second load level within the first turn-on pulse of the high-side switch.

12 Claims, 9 Drawing Sheets

FAST PWM DIMMING APPARATUS AND CONTROL METHOD

TECHNICAL FIELD

The present invention relates to a fast pulse width modulation (PWM) dimming apparatus and control method, and, in particular embodiments, to a fast PWM dimming apparatus and control method for light-emitting diode (LED) applications.

BACKGROUND

A light-emitting diode is a semiconductor light source. When a voltage is applied to an LED, a current flows through the LED. In response to the current flowing through the LED, electrons and holes recombine in the PN junction of the diode. In the recombination process, energy is released in the form of photons. The intensity of light produced by an LED is proportional to the current flowing through the LED. The current flowing through the LED can be adjusted so as to change the brightness level of the LED.

The control process of adjusting the current flowing through an LED is often termed as dimming. The dimming process can be divided into two categories, namely analog dimming and PWM dimming.

Analog dimming involves continuously varying the voltage or current supplied to the LED so as to adjust its brightness. In an analog dimming process, a controller changes the amplitude of the electrical signal in a smooth, continuous manner, allowing for a seamless adjustment of brightness levels.

PWM dimming, on the other hand, involves rapidly switching the LED on and off at a fixed frequency. The brightness of the LED is controlled by varying the ratio of the on time of the LED to the off time of the LED within each cycle. The ratio is also known as a duty cycle. For example, a longer on duration of the LED within each cycle results in increased brightness. Conversely, a shorter on duration of the LED within the cycle results in decreased brightness. PWM dimming is usually achieved using suitable microcontrollers such as PWM controllers, specialized LED drivers and the like.

A constant on time control scheme has been widely adopted in PWM dimming for achieving fast transient response. The constant on time control scheme is a technique used in power converters to regulate the output voltage or current. For example, in a step-down power converter, when the output voltage decreases due to a load change or other factors, the constant on time control circuit adjusts the off time of the high-side switch, keeping the on time of the high-side switch constant. This means that the high-side switch is turned on for the same duration in each cycle, but the off-time varies based on the load conditions.

A step-down power converter employing the constant on-time control scheme may only comprise a comparator and an on timer. In operation, the comparator directly compares a feedback signal with a predetermined reference. When the feedback signal falls below the predetermined reference, the high-side switch of the step-down power converter is turned on and remains on for the duration determined by the on timer. As a result of turning on the high-side switch, the inductor current of the step-down power converter rises. The high-side switch of the step-down power converter turns off when the on timer expires, and does not turn on until the feedback signal falls below the predetermined reference again.

In summary, when the constant on time control scheme is employed in a power converter, the on time of the high-side switch of the power converter is terminated by the on timer. The off time of the high-side switch of the power converter is terminated by the comparator.

Typically, a constant on time control-based LED driver tends to exhibit sluggish dynamic response in the PWM dimming process. This sluggishness presents challenges in swiftly aligning the output current with the PWM dimming signal. It would be desirable to have a fast PWM dimming apparatus and control method to improve PWM dimming accuracy. The present disclosure addresses this need.

SUMMARY

These and other problems are generally solved or circumvented, and technical advantages are generally achieved, by preferred embodiments of the present disclosure which provide a fast PWM dimming apparatus and control method for LED applications.

In accordance with an embodiment, an apparatus comprises an on timer configured to determine an on time of a high-side switch of a step-down power converter, an offset current control stage configured to convert a voltage difference between a compensation signal and a predetermined reference into a current difference, a current comparison stage configured to amplify a sensed current signal, and a PWM comparator having inputs coupled to two outputs of the current comparison stage and two outputs of the offset current control stage, wherein during a load transient from a first load level to a second load level and in a first turn-on pulse of the high-side switch, the on timer is disabled so that a current flowing through the step-down power converter reaches the second load level within the first turn-on pulse of the high-side switch.

In accordance with another embodiment, a method comprises in response to a leading edge of a load transient signal, in a first turn-on pulse of a high-side switch of a step-down power converter, disabling an on timer of a controller, and configuring a current comparison stage of the controller such that a current flowing through the step-down power converter reaches a final load level of a load transient within the first turn-on pulse of the high-side switch.

In accordance with yet another embodiment, a system comprises a high-side switch and a low-side switch connected in series between an input voltage bus and ground, an inductor and a current sense resistor connected in series between a common node of the high-side switch and the low-side switch, and an output terminal of the step-down power converter, an output capacitor connected between the output terminal of the step-down power converter and ground, and a controller comprising an on timer configured to determine an on time of the high-side switch of a step-down power converter, an offset current control stage configured to convert a voltage difference between a compensation signal and a predetermined reference into a current difference, a current comparison stage configured to amplify a sensed current signal, and a PWM comparator having inputs coupled to two outputs of the current comparison stage and two outputs of the offset current control stage, wherein during a load transient from a first load level to a second load level and in a first turn-on pulse of the high-side switch, the on timer is disabled so that a current flowing through the step-down power converter reaches the second load level within the first turn-on pulse of the high-side switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a fast PWM dimming apparatus for LED applications. The disclosure may also be applied, however, to a variety of power applications. Hereinafter, various embodiments will be explained in detail with reference to the accompanying drawings.

Figure 1:
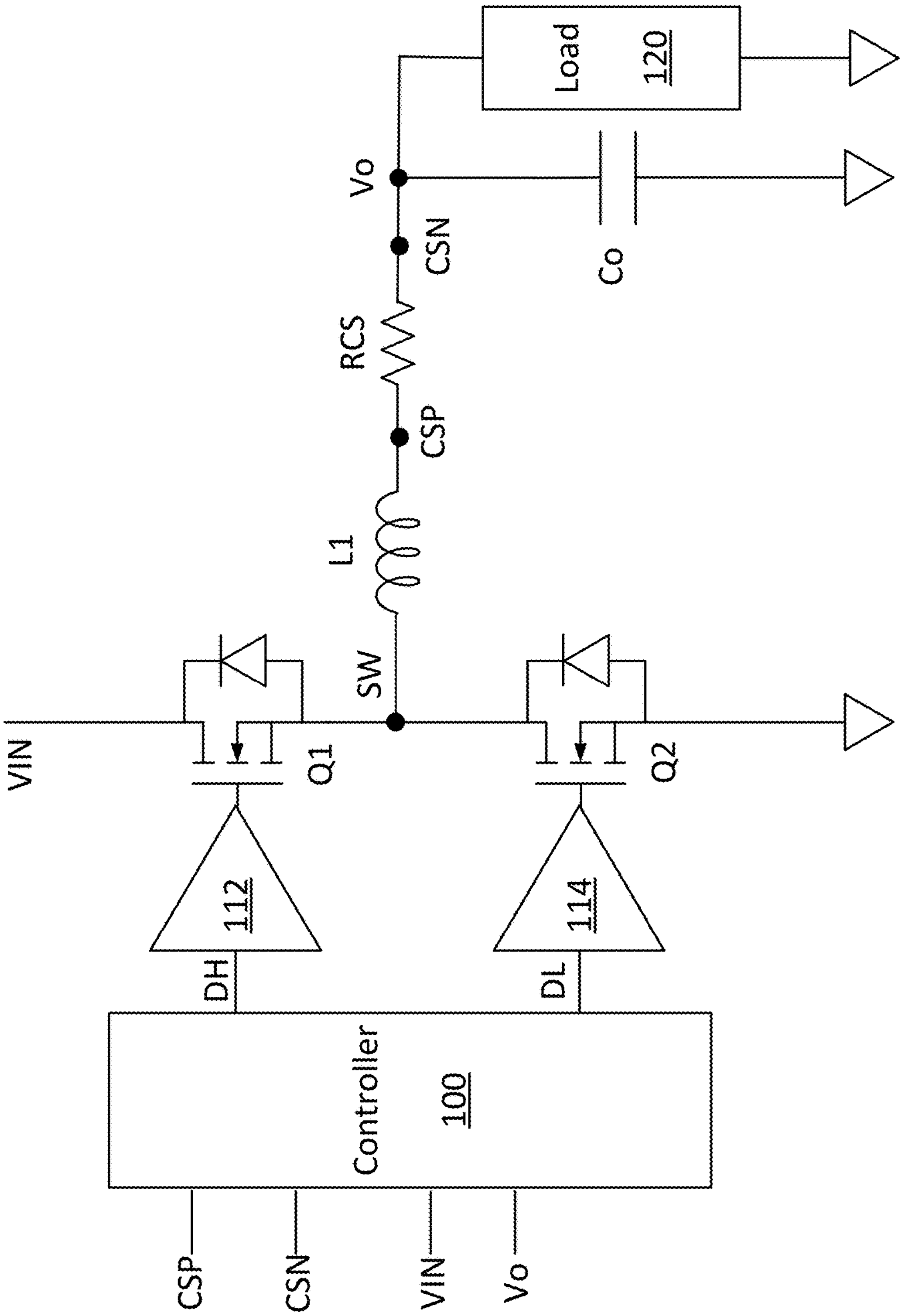
FIG. 1 illustrates a diagram of a power conversion system having a fast PWM dimming apparatus in accordance with various embodiments of the present disclosure.

FIG. 1 illustrates a diagram of a power conversion system having a fast PWM dimming apparatus in accordance with various embodiments of the present disclosure. The power conversion system comprises a step-down power converter. The step-down power converter comprises a high-side switch Q1 and a low-side switch Q2 connected in series between an input voltage bus VIN and ground. The step-down power converter further comprises an inductor L1 and a current sense resistor RCS connected in series between a common node of the high-side switch Q1 and the low-side switch Q2, and an output terminal Vo of the step-down power converter. An output capacitor Co is connected between the output terminal Vo of the step-down power converter and ground.

The common node of the high-side switch Q1 and the low-side switch Q2 is denoted as a switching node SW. A first terminal of the current sense resistor RCS (a common node of the inductor L1 and the current sense resistor RCS) is denoted as a CSP node. A second terminal of the current sense resistor RCS is denoted as a CSN node.

In accordance with an embodiment, the switches of FIG. 1 (e.g., switches Q1 and Q2) may be metal oxide semiconductor field-effect transistor (MOSFET) devices. Alternatively, the switches can be any controllable switches such as insulated gate bipolar transistor (IGBT) devices, integrated gate commutated thyristor (IGCT) devices, gate turn-off thyristor (GTO) devices, silicon-controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 1 shows the switches Q1 and Q2 are implemented as single n-type transistors, a person skilled in the art would recognize there may be many variations, modifications and alternatives. For example, depending on different applications and design needs, at least some of the switches (e.g., Q1) may be implemented as p-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

As shown in FIG. 1, a load 120 is connected between the output terminal Vo of the step-down power converter and ground. In some embodiments, the load 120 comprises a plurality of light-emitting diodes connected in series. The brightness of the plurality of light-emitting diodes is controlled by PWM dimming. In a PWM dimming process, the step-down power converter rapidly switches the plurality of light-emitting diodes on and off at a fixed frequency. The brightness of the plurality of light-emitting diodes is determined by a PWM dimming duty ratio. The PWM dimming duty ratio is a ratio of the duration of a logic high level of the PWM dimming signal to a period of the PWM dimming signal. The brightness the plurality of light-emitting diodes can be adjusted by varying the PWM dimming duty ratio. In some embodiments, the brightness of the plurality of light-emitting diodes is positively proportional to the PWM dimming duty ratio.

In steady operation, the step-down power converter shown in FIG. 1 is controlled by a constant on time control scheme, or the step-down power converter operates in a constant on time mode. In a PWM dimming process, the current flowing through the plurality of light-emitting diodes changes from a first load level (e.g., zero amperes) to a second load level (e.g., one ampere or two amperes). In response to the leading edge of the PWM dimming signal, the constant on time control scheme is temporarily disabled. A fast PWM dimming control scheme is employed. In other words, the step-down power converter operates in a fast PWM dimming mode. In the fast PWM dimming mode, the current flowing through the plurality of light-emitting diodes can reach a predetermined PWM dimming current (e.g., the second load level) within a first turn-on pulse of the high-side switch Q1.

As shown in FIG. 1, a controller 100 is configured to receive a plurality of operating parameters including a voltage signal on the CSP node, a voltage signal on the CSN node, a voltage signal on the input voltage bus VIN, a voltage signal on the output terminal Vo and the like. Based on the received signals, the controller 100 is able to generate gate drive signals DH and DL for the high-side switch Q1 and the low-side switch Q2, respectively. As shown in FIG. 1, the high-side gate drive signal DH is fed into the gate of the high-side switch Q1 through a first driver 112. The low-side gate drive signal DL is fed into the gate of the low-side switch Q2 through a second driver 114. Both the first driver 112 and the second driver 114 have a sufficient drive capability to reduce switching losses. As a result, the high-side switch Q1 and the low-side switch Q2 are able to operate at a predetermined high switching frequency. Furthermore, the controller 100 is configured to receive a PWM dimming signal. According to the PWM dimming signal, the step-down power converter switches the plurality of light-emitting diodes on and off at a predetermined PWM dimming duty ratio. More particularly, when the PWM dimming signal changes from a logic low state to a logic high state, the current flowing through the plurality of light-emitting diodes changes from a first load level (e.g., zero amperes) to a second load level (e.g., two amperes). On the other hand, when the PWM dimming signal changes from a logic high state to a logic low state, the current flowing through the plurality of light-emitting diodes changes from the second load level to the first load level.

In some embodiments, the controller 100 comprises an on timer, an offset current control stage, an offset current control stage, a current comparison stage, a PWM comparator and an enable circuit. The on timer is configured to determine an on time of the high-side switch Q1 of the step-down power converter. The offset current control stage is configured to convert a voltage difference between a compensation signal and a predetermined reference into a current difference. The current comparison stage is configured to amplify a sensed current signal. The sensed current signal is equal to or proportional to the voltage across the CSP node and the CSN node. The PWM comparator has two inputs coupled to two outputs of the current comparison stage and two outputs of the offset current control stage respectively. The enable circuit is configured such that during a PWM dimming process (e.g., the PWM dimming signal changes from a logic low state to a logic high state, and the current flowing through the plurality of light-emitting diodes changes from the first load level to the second load level), in a first turn-on pulse of the high-side switch Q1, the on timer is disabled. As a result of disabling the ton timer, the current flowing through the step-down power converter reaches the second load level within the first turn-on pulse of the high-side switch Q1.

During the PWM dimming process, in a first implementation of the controller 100, the two outputs of the offset current control stage are disconnected from the two inputs of the PWM comparator during the first turn-on pulse of the high-side switch Q1. The detailed circuit diagram of the first implementation of the controller 100 will be described below with respect to FIG. 2.

During the PWM dimming process, in a second implementation of the controller 100, the two outputs of the offset current control stage are connected to the two inputs of the PWM comparator during the first turn-on pulse of the high-side switch Q1. The detailed circuit diagram of the second implementation of the controller 100 will be described below with respect to FIG. 6.

During the PWM dimming process, in a third implementation of the controller 100, the two outputs of the offset current control stage are interchanged and subsequently connected to the two inputs of the PWM comparator during the first turn-on pulse of the high-side switch Q1. The detailed circuit diagram of the third implementation of the controller 100 will be described below with respect to FIG. 8.

Figure 2:
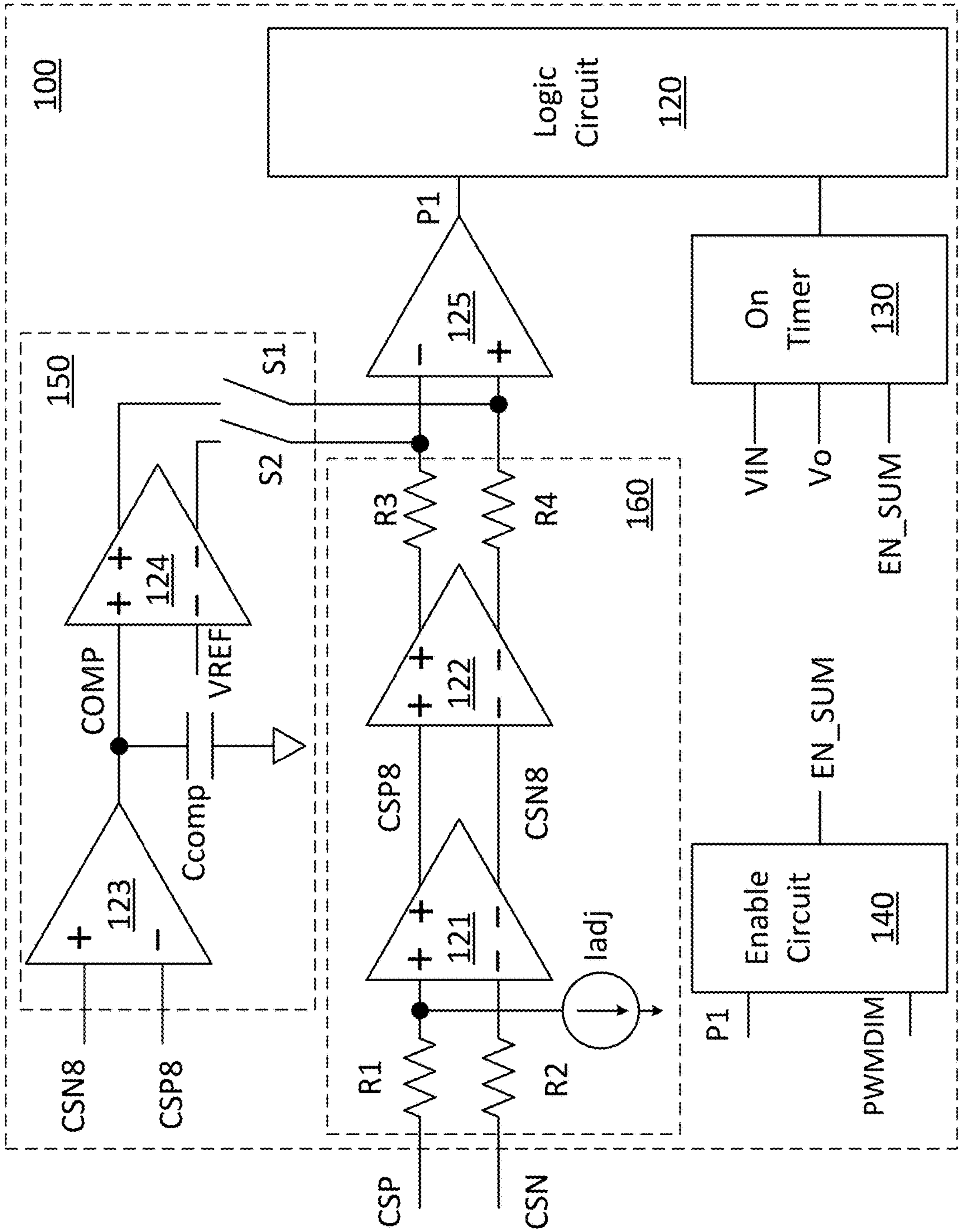
FIG. 2 illustrates a schematic diagram of a first implementation of the controller having the fast PWM dimming apparatus shown in FIG. 1 in accordance with various embodiments of the present disclosure.

FIG. 2 illustrates a schematic diagram of a first implementation of the controller having the fast PWM dimming apparatus shown in FIG. 1 in accordance with various embodiments of the present disclosure. The controller 100 comprises an on timer 130, an offset current control stage 150, a current comparison stage 160, a PWM comparator 125, a logic circuit 120 and an enable circuit 140.

The on timer 130 is configured to determine an on time of the high-side switch Q1 of the step-down power converter. The on timer 130 has three inputs and one output. As shown in FIG. 2, the on timer 130 is configured to receive the input voltage VIN, the output voltage Vo, and an enable signal EN_SUM. Based upon the received signals, the on timer 130 is configured to generate a control signal fed into the logic circuit 120.

In some embodiments, the on timer 130 includes a current source, a capacitor, a switch and a comparator. The current source and the capacitor are connected in series. The switch and the capacitor are connected in parallel. An inverting terminal of the comparator is connected to the common node of the current source and the capacitor. A non-inverting terminal is a predetermined reference. In some embodiments, the current source may be coupled to the input voltage VIN. Furthermore, the current level of the current source is proportional to the input voltage VIN. More particularly, the current level of the current source may be equal to the input voltage VIN divided by a predetermined resistor. The predetermined reference may be proportional to the output voltage of the step-down power converter.

As shown in FIG. 2, the current comparison stage 160 comprises a first amplifier 121, a second amplifier 122, a first resistor R1, a second resistor R2, an adjustable current source Iadj, a third resistor R3 and a fourth resistor R4. In some embodiments, the gain of the first amplifier 121 is equal to three. The gain of the second amplifier 122 is equal to one. The resistance value of the first resistor R1 is 10,000 ohms. The resistance value of the second resistor R2 is 10,000 ohms. The resistance value of the third resistor R3 is 80,000 ohms. The resistance value of the fourth resistor R4 is 80,000 ohms. The current flowing through the adjustable current source Iadj is in a range from 1 microampere to 100 microamperes. In some embodiments, the current flowing through the adjustable current source Iadj is equal to 10 microamperes.

A non-inverting input of the first amplifier 121 is connected to the CSP node (a common node of the inductor L1 and the current sense resistor RCS) through the first resistor R1. An inverting input of the first amplifier 121 is connected to the CSN node (the output terminal of the step-down power converter) through the second resistor R2. The adjustable current source Iadj is connected to the non-inverting input of the first amplifier 121. In operation, a current flowing through the adjustable current source Iadj is proportional to the PWM dimming current (e.g., two amperes).

A non-inverting input of the second amplifier 122 is connected to a first output of the first amplifier 121. The bus connected between the non-inverting input of the second amplifier 122 and the first output of the first amplifier 121 is denoted as a CSP8 node. An inverting input of the second amplifier 122 is connected to a second output of the first amplifier 121. The bus connected between the inverting input of the second amplifier 122 and the second output of the first amplifier 121 is denoted as a CSN8 node. The third resistor R3 is connected between a first output of the second amplifier 122 and an inverting input of the PWM comparator 125. The fourth resistor R4 is connected between a second output of the second amplifier 122 and a non-inverting input of the PWM comparator 125.

The voltage across the node CSP and the node CSN is a sensed current signal. This sensed current signal is proportional to the current flowing through the inductor L1. The current comparison stage 160 is configured to receive the sensed current signal and amplify the sensed current signal to a suitable level fed into the PWM comparator 125.

The offset current control stage 150 comprises a third amplifier 123, a compensation capacitor Ccomp, a fourth amplifier 124, a first auxiliary switch S1 and a second auxiliary switch S2. As shown in FIG. 2, a non-inverting input of the third amplifier 123 is connected to the inverting input of the second amplifier 122. An inverting input of the third amplifier 123 is connected to the non-inverting input of the second amplifier 122. The compensation capacitor Ccomp is connected between an output of the third amplifier 123 and ground. The third amplifier 123 is configured to generate a compensation signal COMP across the compensation capacitor Ccomp. A non-inverting input of the fourth amplifier 124 is configured to receive the compensation signal COMP. An inverting input of the fourth amplifier 124 is configured to receive a predetermined reference VREF.

The first auxiliary switch S1 is connected between a first output of the fourth amplifier 124 and the non-inverting input of the PWM comparator 125. The second auxiliary switch S2 is connected between a second output of the fourth amplifier 124 and the inverting input of the PWM comparator 125. Both the first auxiliary switch S1 and the second auxiliary switch S2 are controlled by the enable signal EN_SUM generated by the enable circuit 140.

During normal operation, the enable signal EN_SUM is configured such that both the first auxiliary switch S1 and the second auxiliary switch S2 are turned on. As a result, the offset current control stage 150 is connected to the PWM stage 125 through the turned on S1 and S2. On the other hand, during a PWM dimming load transient, within the first turn-on pulse of the high-side switch Q1, both the first auxiliary switch S1 and the second auxiliary switch S2 are turned off. As a result, the offset current control stage 150 is disconnected from the PWM stage 125.

In some embodiments, the third amplifier 123 functions as an integrator. The fourth amplifier 124 functions as a transconductance amplifier. The output current of the fourth amplifier 124 is directly proportional to the input voltage of the fourth amplifier 124. During normal operation, the offset current control stage 150 is configured to convert a voltage difference between a compensation signal and a predetermined reference into a current difference. This current difference is added to the inputs of the PWM comparator 125 through the third resistor R3 and the fourth resistor R4. The offset current control stage 150 is employed to determine the current ripple of the current flowing through the inductor L1.

The enable circuit 140 is configured to generate the enable signal EN_SUM. During normal operation, EN_SUM is configured such that the on timer 130 is enabled, and S1 and S2 are turned on. The offset current control stage 150 is connected to the PWM comparator 125. In response to a leading edge of the PWM dimming signal, EN_SUM is configured such that the on timer 130 is disabled, and S1 and S2 are turned off. The offset current control stage 150 is disconnected from the PWM comparator 125 in the first turn-on pulse of the high-side switch Q1. The detailed circuit structure of the enable circuit 140 will be described below with respect to FIG. 3.

In operation, when the on timer 130 is enabled, the output of the on timer 130 determines the turn-off edge or the trailing edge of the gate drive signal applied to the high-side switch Q1. The PWM comparator 125 is configured to generate a control signal P1 fed into the logic circuit 120. The control signal P1 determines the turn-on edge or the leading edge of the gate drive signal applied to the high-side switch Q1. When the on timer 130 is disabled, the control signal P1 determines the turn-off edge of the gate drive signal applied to the high-side switch Q1.

In a PWM dimming process, during a load transient from a first load level to a second load level and in a first turn-on pulse of the high-side switch Q1, the two outputs of the offset current control stage 150 are disconnected from the two inputs of the PWM comparator 125 through turning off S1 and S2. The on timer 130 is disabled. Once the offset current control stage 150 is disconnected from the PWM comparator 125 and the on time 130 is disabled, the PWM comparator 125 is configured to generate a logic high signal until a valley trigger occurs. In operation, the valley trigger occurs when the current flowing through the inductor L1 is equal to the desired current (the desired current is the PWM dimming current determined by the current of Iadj). In other words, the PWM comparator 125 is able to keep turning on the high-side switch Q1 until the current flowing through the inductor L1 is equal to the PWM dimming current. Since the low-side switch Q2 is not turned on, the current flowing through the step-down power converter can reach the second load level within the first turn-on pulse of the high-side switch Q1.

Figure 3:
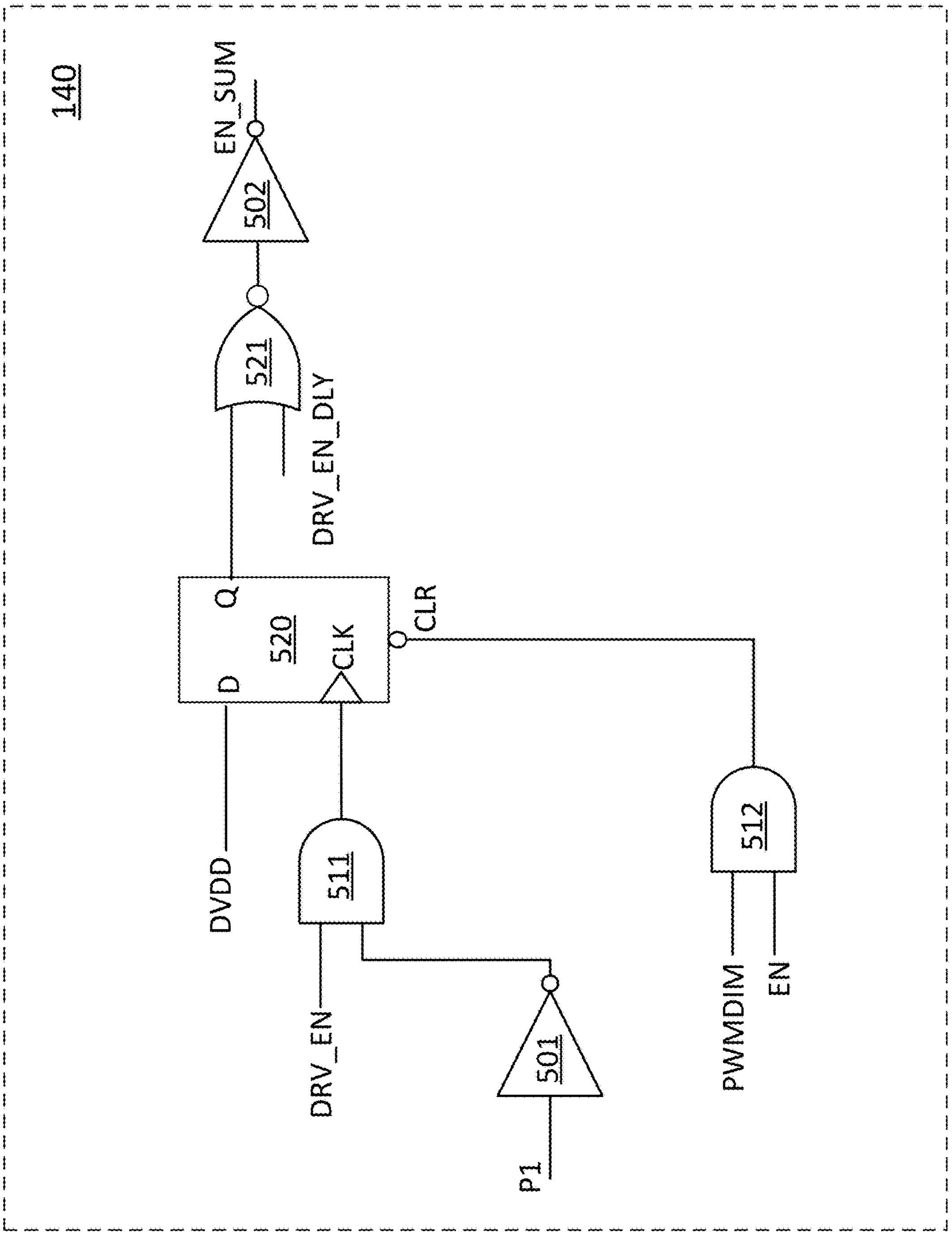
FIG. 3 illustrates a schematic diagram of the enable circuit shown in FIG. 2 in accordance with various embodiments of the present disclosure.

FIG. 3 illustrates a schematic diagram of the enable circuit shown in FIG. 2 in accordance with various embodiments of the present disclosure. The enable circuit 140 comprises a first AND gate 511, a second AND gate 512, a first inverter 501, a second inverter 502, a latch 520 and an NOR gate 521.

An input of the first inverter 501 is configured to receive the control signal P1 generated by the PWM comparator 125. A first input of the first AND gate 511 is configured to receive a gate drive enable signal DRV_EN. A second input of the first AND gate 511 is configured to receive an output signal of the first inverter 501. A first input of the second AND gate 512 is configured to receive a PWM dimming signal PWMDIM. A second input of the second AND gate 512 is configured to receive a power converter enable signal EN.

A data input of the latch 520 is connected to a bias voltage bus DVDD. A clock input of the latch 520 is connected to an output of the first AND gate 501. A clear and reset input of the latch 520 is connected to an output of the second AND gate 512. A first input of the NOR gate 521 is connected to an output of the latch 520. A second input of the NOR gate 521 is configured to receive a signal DRV_EN_DLY. The signal DRV_EN_DLY is configured to determine a maximum pulse width of the first turn-on pulse of the high-side switch Q1. An input of the second inverter 502 is connected to an output of the NOR gate 521. The enable signal EN_SUM is generated at the output of the second inverter 502.

In normal operation, both DRV_EN and EN have a logic high state. The voltage on the bias voltage bus DVDD is equivalent to a logic high state. The signal DRV_EN_DLY is a protection signal. DRV_EN_DLY is related to the maximum pulse width of the first turn-on pulse of the high-side switch Q1. When the pulse width of the first turn-on pulse of the high-side switch Q1 is within a predetermined pulse width, DRV_EN_DLY has a logic low state. The enable signal EN_SUM is determined by the output signal of the latch 520. When the pulse width of the first turn-on pulse of the high-side switch Q1 is over the predetermined pulse width, DRV_EN_DLY has a logic high state. The logic high state of DRV_EN_DLY forces the enable signal EN_SUM to have a logic high state. In other words, the power converter leaves the fast PWM dimming mode and enters into the normal operation mode. In the normal operation mode, the on timer turns off the high-side switch Q1 in each cycle to ensure that the turn-on time of Q1 does not escalate uncontrollably.

In response to a logic low state of the PWM dimming signal PWMDIM, the output of the latch 520 is reset. A logic low signal is fed into the NOR gate 521. From a beginning of the turn-on time of Q1, within a predetermined time period (e.g., 20 microseconds), DRV_EN_DLY has a logic low state. The output of the NOR gate 521 generates a logic high signal fed into the second inverter 502. In response to this logic high signal fed into the second inverter 502, the enable signal EN_SUM has a logic low state. This logic low state of EN_SUM functions as a disable signal. The disable signal turns off S1 and S2, thereby disconnecting the offset current control stage 150 from the PWM comparator 125. Furthermore, the disable signal is applied to the on timer 130. Consequently, the on timer 130 is disabled. As a result of disconnecting the offset current control stage 150 from the PWM comparator 125 and disabling the on timer 130, the high-side switch Q1 keeps on until the current flowing through the inductor L1 reaches a predetermined level (e.g., the PWM dimming current). Once the current flowing through the inductor L1 reaches the predetermined level, the output signal (P1) of the PWM comparator 125 changes from a logic high state to a logic low state. In response to the logic low state of P1, the first inverter 501 generates a logic high signal fed into the first AND gate 511. In normal operation, DRV_EN has a logic high state. The output of the first AND gate 511 changes from a logic low state to a logic high state. In response to the rising edge of the output of the first AND gate 511, the output of the latch 520 generates a logic high signal. This logic high signal is fed into the NOR gate 521 and the second inverter 502. At the output of the second inverter 502, the enable signal EN_SUM changes from a logic low state to a logic high state. This logic high state of EN_SUM functions as an enable signal. The enable signal turns on S1 and S2, thereby connecting the offset current control stage 150 to the PWM comparator 125. Furthermore, the enable signal activates the on timer 130. As a result of connecting the offset current control stage 150 to the PWM comparator 125 and enabling the on timer 130, the step-down power converter operates in the constant on time mode.

Figure 4:
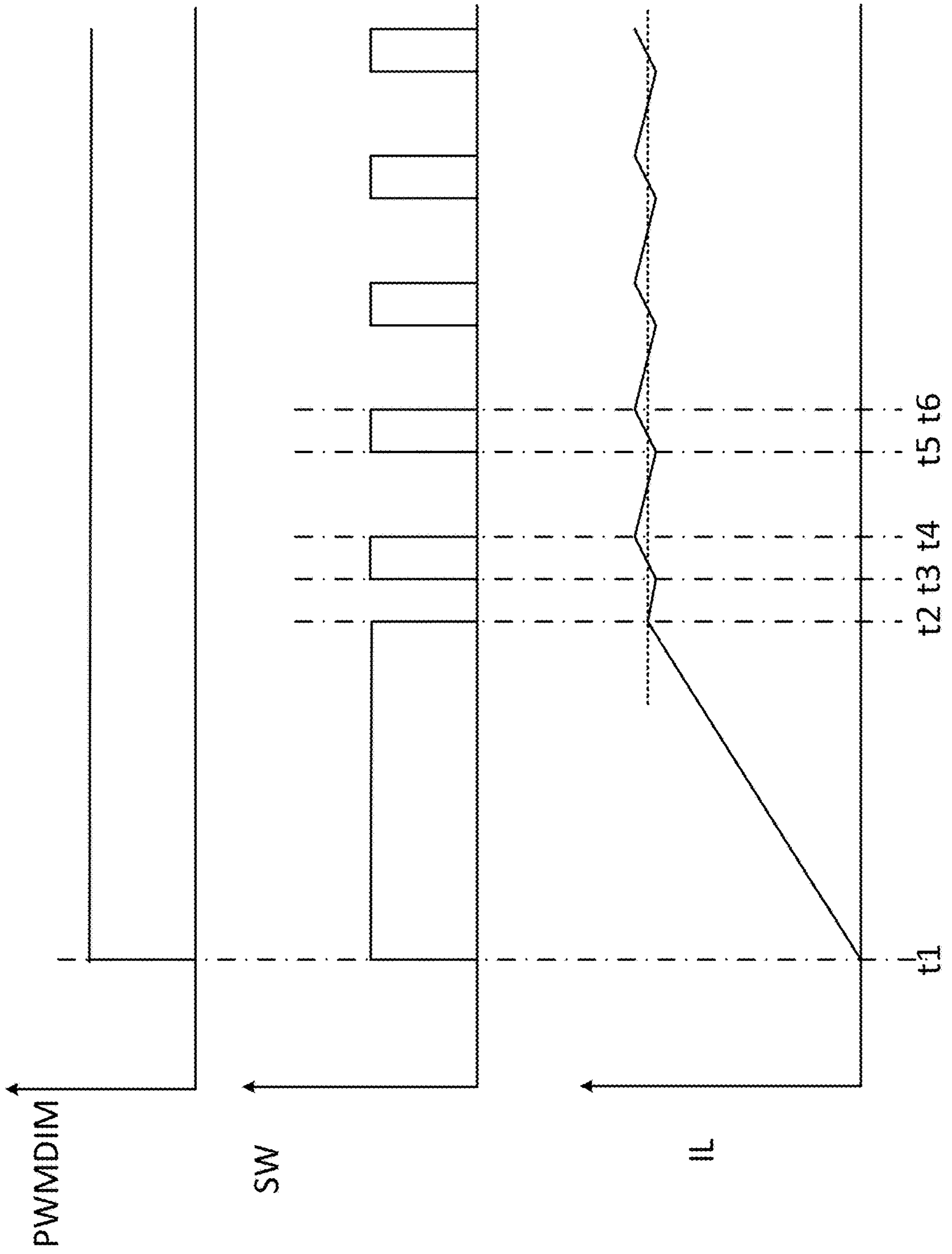
FIG. 4 illustrates, under the first implementation of the controller, the voltage on the switching node and the current flowing through the inductor in accordance with various embodiments of the present disclosure.

FIG. 4 illustrates, under the first implementation of the controller, the voltage on the switching node and the current flowing through the inductor in accordance with various embodiments of the present disclosure. The horizontal axis of FIG. 4 represents intervals of time. There may be three rows in FIG. 4. The first row represents a PWM dimming signal PWMDIM. The second row represents the voltage on the switching node SW. The third row represents the current flowing through the inductor L1.

At t1, the PWM dimming signal PWMDIM changes from a logic low state to a logic high state. In response to the leading edge of the PWM dimming signal, the current flowing through the inductor L1 changes from a first load level (e.g., zero amperes) to a second load level (e.g., two amperes). During this load transient, the voltage on the switching node SW remains high in a wide pulse from t1 to t2. The high voltage on the switching node SW indicates the high-side switch Q1 remains on from t1 to t2.

From t1 to t2, referring back to FIG. 2, the offset current control stage 150 is disconnected from the PWM comparator 125. In some embodiments, before the power converter leaves the fast PWM dimming mode and enters into the constant on time mode, the voltage value of the compensation signal is preset at a voltage level equal to the voltage value of the compensation signal in the immediately previous PWM dimming cycle. In alternative embodiments, the voltage value of the compensation signal is preset at a voltage level corresponding to one fourth of the full current flowing through the step-down power converter. The preset comp value helps the step-down power converter achieve a smooth transition between the fast PWM dimming mode and the constant on time mode.

At t2, the current flowing through the inductor L1 reaches the second load level. Referring back to FIG. 2, the PWM comparator 125 generates a logic low signal to turn off the high-side switch Q1. This logic low signal is also fed into the enable circuit 140. As described above with respect to FIG. 3, the enable circuit 140 generates an enable signal in response to this logic low signal. At t2, the enable signal is configured to connect the offset current control stage 150 to the PWM comparator 125, and enable the on timer 130. The step-down power converter operates in the constant on time mode from t2 to t6. From t3 to t5, it is one switching cycle. The on time (from t3 to t4) of the high-side switch Q1 is shorter than the first turn-on pulse (from t1 to t2) of the high-side switch Q1.

One advantageous feature of having the wide turn-on pulse (from t1 to t2) shown in FIG. 4 is the significantly enhanced transient response of the step-down power converter in the present disclosure compared to conventional counterparts. This fast transient response proves particularly advantageous in applications with minimal PWM dimming duty cycles. In conventional step-down converters, achieving a satisfactory load transient response often requires multiple switching cycles. Achieving the desired current level takes longer. In applications employing a low PWM dimming duty cycle, the load transient may remain incomplete within the low PWM dimming duty cycle, leading to compromised accuracy. In contrast, the fast load transient response facilitated by the present disclosure can be accomplished within a low PWM dimming duty cycle, thereby improving the PWM dimming accuracy.

Figure 5:
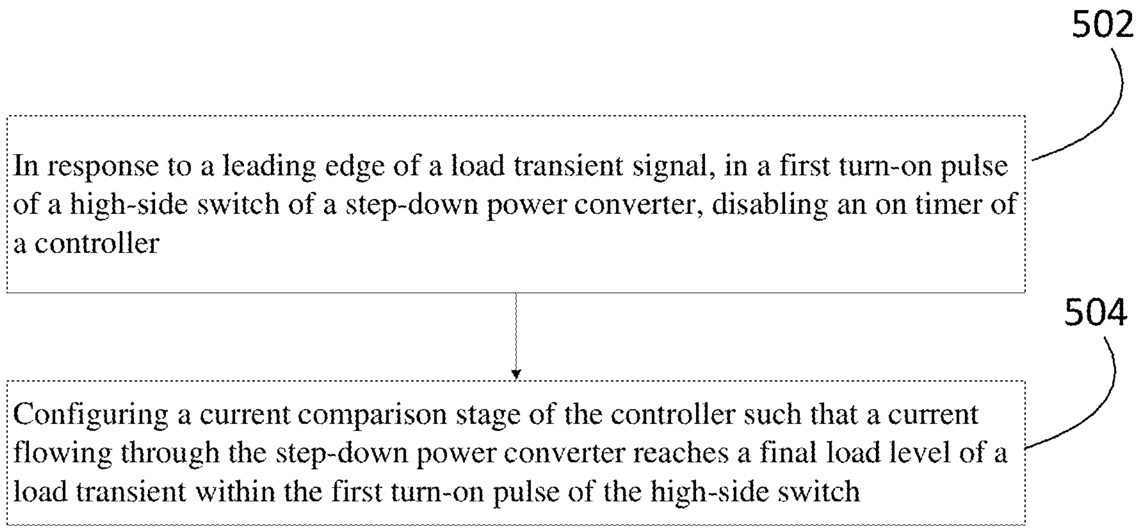
FIG. 5 illustrates a flow chart of controlling the step-down converter shown in FIG. 1 in accordance with various embodiments of the present disclosure.

FIG. 5 illustrates a flow chart of controlling the step-down converter shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

Referring back to FIG. 1, the step-down converter comprises a high-side switch Q1 and a low-side switch Q2 connected in series between an input voltage bus VIN and ground. The step-down power converter further comprises an inductor L1 and a current sense resistor RCS connected in series between a common node of the high-side switch Q1 and the low-side switch Q2, and an output terminal of the step-down power converter. An output capacitor Co is connected between the output terminal of the step-down power converter and ground. A load 120 is connected between the output terminal of the step-down power converter and ground. The load 120 comprises a plurality of light-emitting diodes connected in series. A PWM dimming signal is employed to adjust the brightness of the plurality of light-emitting diodes. In response to a leading edge of the PWM dimming signal, the current flowing through the inductor L1 changes from a first load level (e.g., zero amperes) to a second load level (e.g., two amperes). In response to a falling edge of the PWM dimming signal, the current flowing through the inductor L1 changes from the second load level to the first load level.

At step 502, in response to a leading edge of a load transient signal, in a first turn-on pulse of a high-side switch of a step-down power converter, an on timer of a controller is disabled.

At step 504, a current comparison stage of the controller is configured such that a current flowing through the step-down power converter reaches a final load level of a load transient within the first turn-on pulse of the high-side switch.

Referring back to FIG. 1, the step-down power converter comprises the high-side switch and a low-side switch connected in series between an input voltage bus and ground, an inductor and a current sense resistor connected in series between a common node of the high-side switch and the low-side switch, and an output terminal of the step-down power converter, and an output capacitor connected between the output terminal of the step-down power converter and ground.

Referring back to FIG. 2, the current comparison stage comprises a first amplifier having a non-inverting input connected to a common node of the inductor and the current sense resistor through a first resistor, and an inverting input connected to the output terminal of the step-down power converter through a second resistor, an adjustable current source connected to the non-inverting input of the first amplifier, and wherein a current flowing through the adjustable current source is proportional to the final load level of the load transient, a second amplifier having a non-inverting input connected to a first output of the first amplifier, and an inverting input connected to a second output of the first amplifier, a third resistor connected between a first output of the second amplifier and an inverting input of the PWM comparator, and a fourth resistor connected between a second output of the second amplifier and a non-inverting input of the PWM comparator.

Referring back to FIG. 2, the offset current control stage comprises a third amplifier having a non-inverting input connected to the inverting input of the second amplifier, and an inverting input connected to the non-inverting input of the second amplifier, a compensation capacitor connected between an output of the third amplifier and ground, and wherein the third amplifier is configured to generate a compensation signal across the compensation capacitor, a fourth amplifier having a non-inverting input configured to receive the compensation signal, and an inverting input configured to receive a predetermined reference, and a first auxiliary switch and a second auxiliary switch coupled between outputs the fourth amplifier and inputs of the PWM comparator.

The method further comprises in steady operation, configuring the step-down power converter to operate in a constant on time mode, wherein an on timer is configured to determine a turn-on time of the high-side switch of the step-down power converter, and in response to the leading edge of the load transient signal, in the first turn-on pulse of the high-side switch of the step-down power converter, disconnecting two outputs of the offset current control stage from two inputs of the PWM comparator through turning off the first auxiliary switch and the second auxiliary switch.

The method further comprises in response to the leading edge of the load transient signal, in the first turn-on pulse of the high-side switch of the step-down power converter, configuring the first auxiliary switch and the second auxiliary switch such that the first auxiliary switch is turned on and coupled between a first output of the fourth amplifier and the non-inverting input of the PWM comparator, and the second auxiliary switch is turned on and coupled between a second output of the fourth amplifier and the inverting input of the PWM comparator, and wherein as a result of turning on the first auxiliary switch and the second auxiliary switch, two outputs of the offset current control stage are connected to two inputs of the PWM comparator.

The method further comprises in steady operation, configuring the first auxiliary switch and the second auxiliary switch such that the first auxiliary switch is turned on and coupled between a first output of the fourth amplifier and the non-inverting input of the PWM comparator, and the second auxiliary switch is turned on and coupled between a second output of the fourth amplifier and the inverting input of the PWM comparator, and in response to the leading edge of the load transient signal, in the first turn-on pulse of the high-side switch of the step-down power converter, configuring the first auxiliary switch and the second auxiliary switch such that the first auxiliary switch is turned on and coupled between the first output of the fourth amplifier and the inverting input of the PWM comparator, and the second auxiliary switch is turned on and coupled between the second output of the fourth amplifier and the non-inverting input of the PWM comparator.

Figure 6:
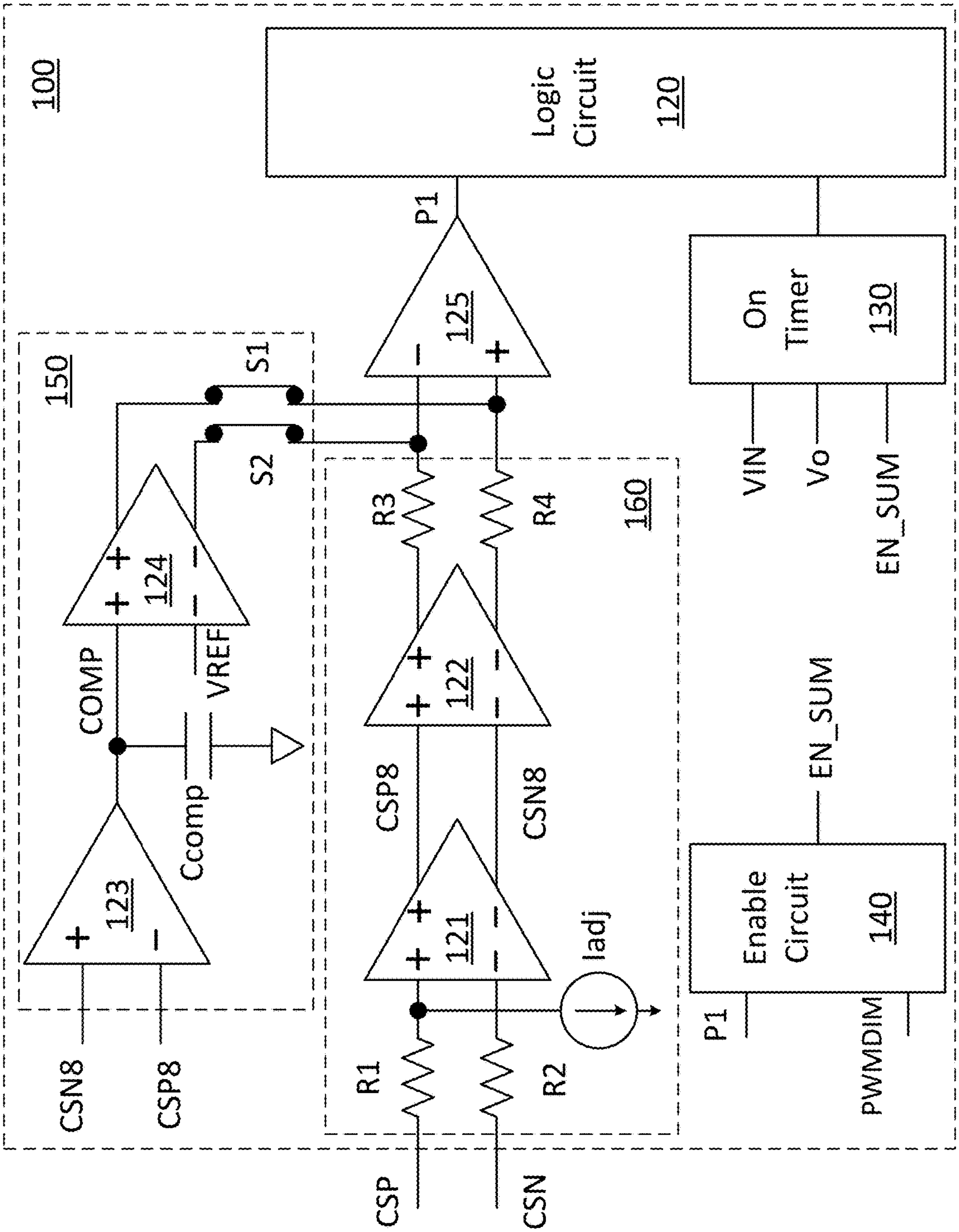
FIG. 6 illustrates a schematic diagram of a second implementation of the controller having the fast PWM dimming apparatus shown in FIG. 1 in accordance with various embodiments of the present disclosure.

FIG. 6 illustrates a schematic diagram of a second implementation of the controller having the fast PWM dimming apparatus shown in FIG. 1 in accordance with various embodiments of the present disclosure. The second implementation of the controller 100 shown in FIG. 6 is similar to the first implementation of the controller 100 shown in FIG. 2 except that during a load transient from a first load level to a second load level, and in a first turn-on pulse of the high-side switch Q1, the first auxiliary switch S1 is turned on and coupled between a first output of the fourth amplifier 124 and a non-inverting input of the PWM comparator 125, and the second auxiliary switch S2 is turned on and coupled between a second output of the fourth amplifier 124 and an inverting input of the PWM comparator 125. As a result of turning on the first auxiliary switch S1 and the second auxiliary switch S2, the two outputs of the offset current control stage 150 are connected to two inputs of the PWM comparator 125.

Figure 7:
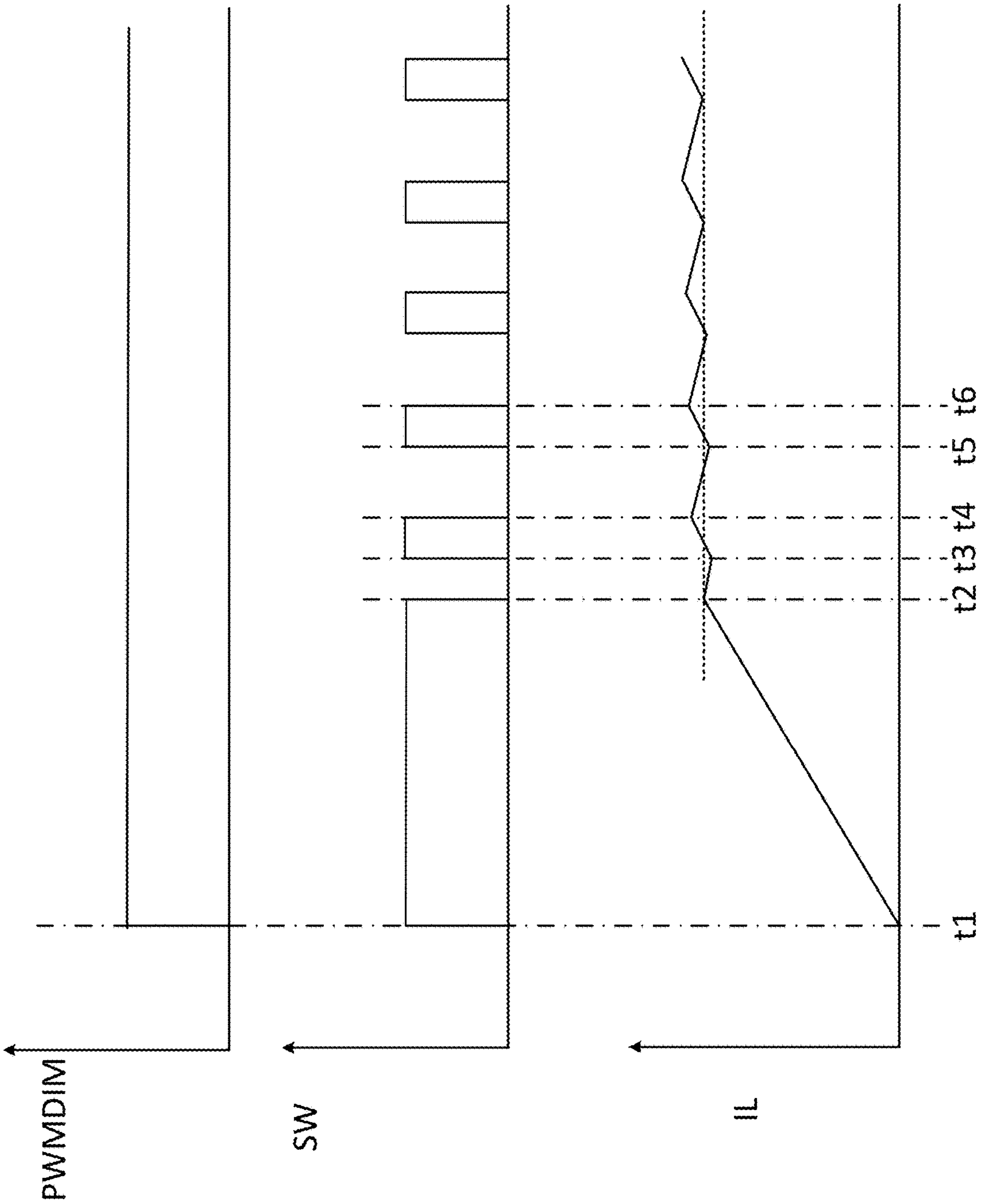
FIG. 7 illustrates, under the second implementation of the controller, the voltage on the switching node and the current flowing through the inductor in accordance with various embodiments of the present disclosure.

FIG. 7 illustrates, under the second implementation of the controller, the voltage on the switching node and the current flowing through the inductor in accordance with various embodiments of the present disclosure. The horizontal axis of FIG. 7 represents intervals of time. There may be three rows in FIG. 7. The first row represents a PWM dimming signal PWMDIM. The second row represents the voltage on the switching node SW. The third row represents the current flowing through the inductor L1.

At t1, the PWM dimming signal PWMDIM changes from a logic low state to a logic high state. In response to the leading edge of the PWM dimming signal, the current flowing through the inductor L1 changes from a first load level (e.g., zero amperes) to a second load level (e.g., two amperes). During this load transient, the voltage on the switching node SW remains high in a wide pulse from t1 to t2. The high voltage on the switching node SW indicates the high-side switch Q1 remains on from t1 to t2.

From t1 to t2, referring back to FIG. 6, the offset current control stage 150 is connected to the PWM comparator 125. The offset current control stage 150 adds an offset. The offset is equal to one half of the ripple current of the step-down power converter. According to the circuit connection shown in FIG. 6, the offset reduces the desired current value from the average value of the second load level to the average value of the second load level minus the offset. Accordingly, at t2, the current flowing through the inductor L1 reaches a valley of the inductor current having an average value equal to the second load level.

From t2 to t6, the waveforms shown in FIG. 7 are similar to the waveforms shown in FIG. 4 except that the off time of the high-side switch Q1 changes over multiple cycles until it stabilizes into steady operation.

Figure 8:
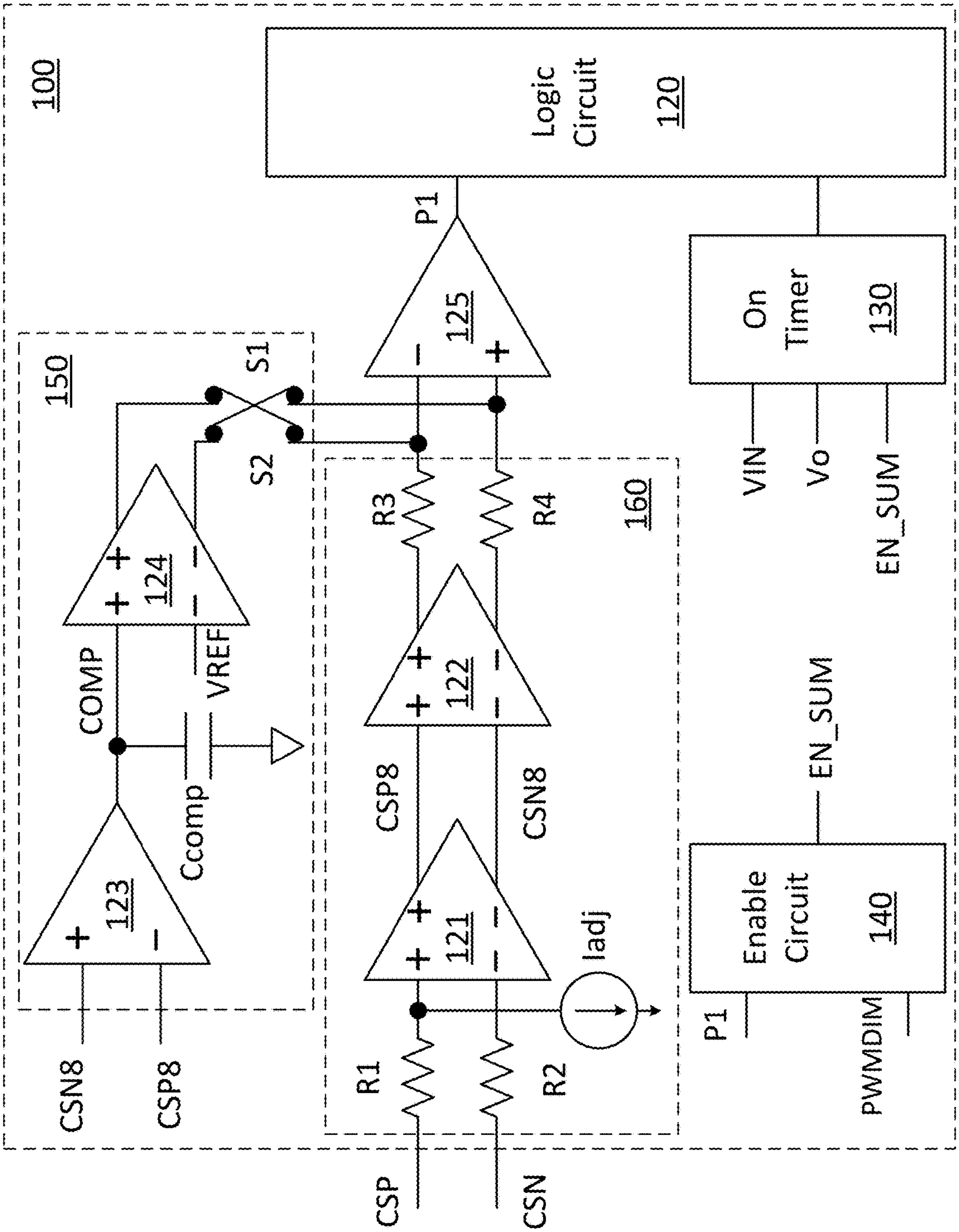
FIG. 8 illustrates a schematic diagram of a third implementation of the controller having the fast PWM dimming apparatus shown in FIG. 1 in accordance with various embodiments of the present disclosure.

FIG. 8 illustrates a schematic diagram of a third implementation of the controller having the fast PWM dimming apparatus shown in FIG. 1 in accordance with various embodiments of the present disclosure. The third implementation of the controller 100 shown in FIG. 8 is similar to the first implementation of the controller 100 shown in FIG. 2 except that during a load transient from a first load level to a second load level, and in a first turn-on pulse of the high-side switch Q1, the first auxiliary switch S1 is turned on and coupled between a first output of the fourth amplifier 124 and an inverting input of the PWM comparator 125, and the second auxiliary switch S2 is turned on and coupled between a second output of the fourth amplifier 124 and a non-inverting input of the PWM comparator 125.

Figure 9:
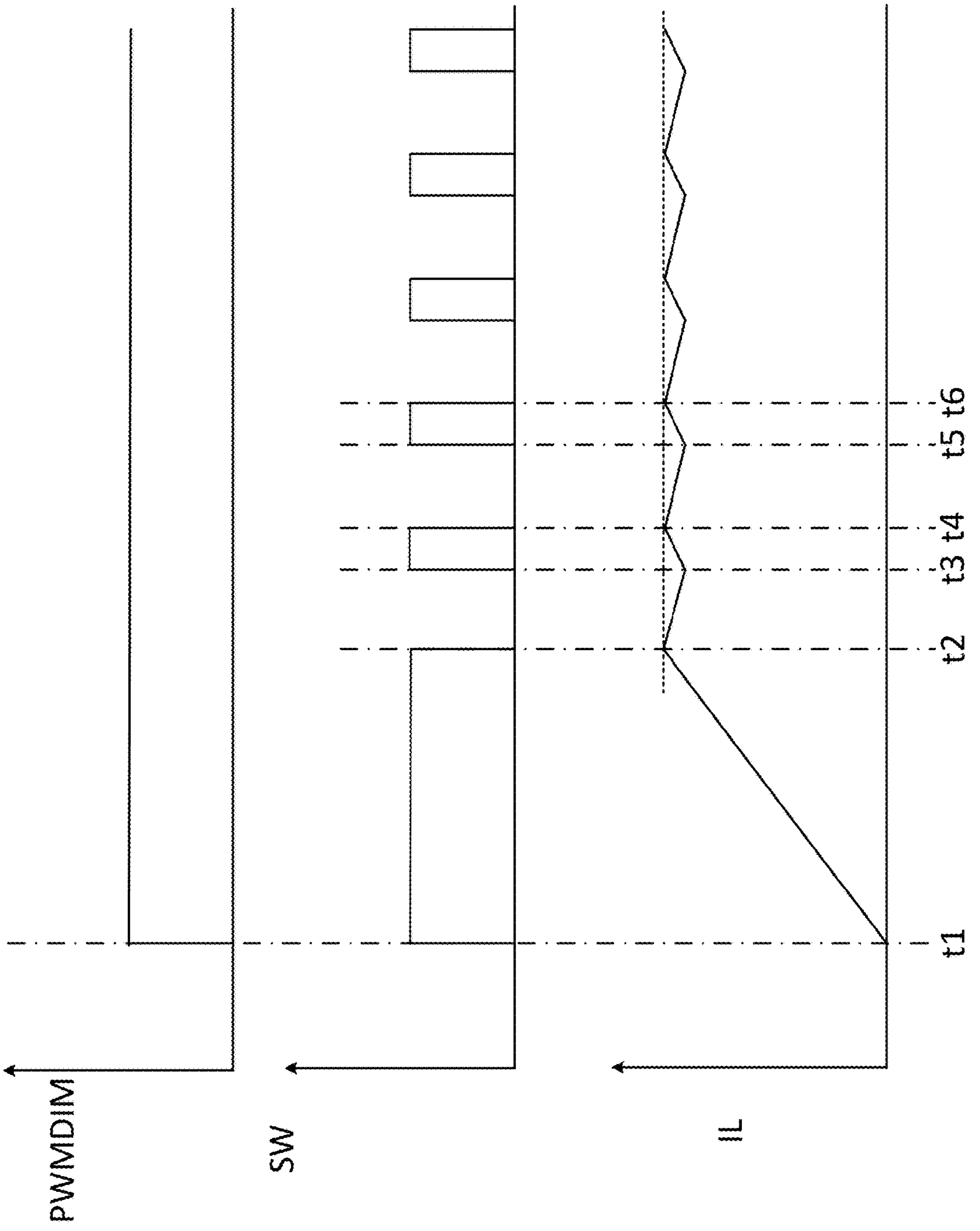
FIG. 9 illustrates, under the third implementation of the controller, the voltage on the switching node and the current flowing through the inductor in accordance with various embodiments of the present disclosure.

FIG. 9 illustrates, under the third implementation of the controller, the voltage on the switching node and the current flowing through the inductor in accordance with various embodiments of the present disclosure. The horizontal axis of FIG. 9 represents intervals of time. There may be three rows in FIG. 9. The first row represents a PWM dimming signal PWMDIM. The second row represents the voltage on the switching node SW. The third row represents the current flowing through the inductor L1.

At t1, the PWM dimming signal PWMDIM changes from a logic low state to a logic high state. In response to the leading edge of the PWM dimming signal, the current flowing through the inductor L1 changes from a first load level (e.g., zero amperes) to a second load level (e.g., two amperes). During this load transient, the voltage on the switching node SW remains high in a wide pulse from t1 to t2. The high voltage on the switching node SW indicates the high-side switch Q1 remains on from t1 to t2.

From t1 to t2, referring back to FIG. 8, the offset current control stage 150 is connected to the PWM comparator 125. The offset current control stage 150 adds an offset. The offset is equal to one half of the ripple current of the step-down power converter. According to the circuit connection shown in FIG. 8, the offset increases the desired current value from the average value of the second load level to the average value of the second load level plus the offset. Accordingly, at t2, the current flowing through the inductor L1 reaches a peak of the inductor current having an average value equal to the second load level.

From t2 to t6, the waveforms shown in FIG. 9 are similar to the waveforms shown in FIG. 4, and hence are not discussed in detail herein.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:

an on timer configured to determine an on time of a high-side switch of a step-down power converter;

an offset current control stage configured to convert a voltage difference between a compensation signal and a predetermined reference into a current difference;

a current comparison stage configured to amplify a sensed current signal; and a PWM comparator having inputs coupled to two outputs of the current comparison stage and two outputs of the offset current control stage, wherein during a load transient from a first load level to a second load level and in a first turn-on pulse of the high-side switch, the on timer is disabled so that a current flowing through the step-down power converter reaches the second load level within the first turn-on pulse of the high-side switch, and wherein during the load transient from the first load level to the second load level and in the first turn-on pulse of the high-side switch, the two outputs of the offset current control stage are disconnected from the two inputs of the PWM comparator so that the current flowing through the step-down power converter reaches the second load level within the first turn-on pulse of the high-side switch.

2. The apparatus of claim 1, wherein:
the step-down power converter is controlled by a constant on time control scheme during steady operation.

3. The apparatus of claim 1, wherein:
the first turn-on pulse of the high-side switch is triggered at a beginning of the load transient, and wherein the load transient occurs in response to a PWM dimming signal.

4. The apparatus of claim 1, wherein the step-down power converter comprises:
the high-side switch and a low-side switch connected in series between an input voltage bus and ground;
an inductor and a current sense resistor connected in series between a common node of the high-side switch and the low-side switch, and an output terminal of the step-down power converter; and
an output capacitor connected between the output terminal of the step-down power converter and ground.

5. The apparatus of claim 4, wherein the current comparison stage comprises:
a first amplifier having a non-inverting input connected to a common node of the inductor and the current sense resistor through a first resistor, and an inverting input connected to the output terminal of the step-down power converter through a second resistor;
an adjustable current source connected to the non-inverting input of the first amplifier;
a second amplifier having a non-inverting input connected to a first output of the first amplifier, and an inverting input connected to a second output of the first amplifier;
a third resistor connected between a first output of the second amplifier and an inverting input of the PWM comparator; and
a fourth resistor connected between a second output of the second amplifier and a non-inverting input of the PWM comparator.

6. The apparatus of claim 5, wherein:
a current flowing through the adjustable current source is proportional to the second load level.

7. The apparatus of claim 5, wherein the offset current control stage comprises:
a third amplifier having a non-inverting input connected to the inverting input of the second amplifier, and an inverting input connected to the non-inverting input of the second amplifier;
a compensation capacitor connected between an output of the third amplifier and ground, and wherein the third amplifier is configured to generate the compensation signal across the compensation capacitor;
a fourth amplifier having a non-inverting input configured to receive the compensation signal, and an inverting input configured to receive a predetermined reference; and
a first auxiliary switch and a second auxiliary switch coupled between outputs the fourth amplifier and the inputs of the PWM comparator.

8. The apparatus of claim 7, wherein:
during steady operation, both the first auxiliary switch and the second auxiliary switch are configured to be turned on so that the offset current control stage is connected to the PWM comparator; and
during the load transient from the first load level to the second load level and in the first turn-on pulse of the high-side switch, both the first auxiliary switch and the second auxiliary switch are configured to be turned off so that the offset current control stage is disconnected from the PWM comparator.

9. The apparatus of claim 1, further comprising:
an enable circuit configured to receive a PWM dimming signal and generate a control signal to:
enable the on timer and configure the offset current control stage to be connected to the PWM comparator during steady operation; and
disable the on timer and configure the offset current control stage to be disconnected from the PWM comparator during the load transient from the first load level to the second load level and in the first turn-on pulse of the high-side switch.

10. The apparatus of claim 9, wherein the enable circuit comprises a first AND gate, a second AND gate, a first inverter, a second inverter, a latch and an NOR gate, and wherein:
an input of the first inverter is configured to receive an output signal of the PWM comparator;
a first input of the first AND gate is configured to receive a gate drive enable signal;
a second input of the first AND gate is configured to receive an output signal of the first inverter;
a first input of the second AND gate is configured to receive a PWM dimming signal;
a second input of the second AND gate is configured to receive a power converter enable signal;
a data input of the latch is connected to a bias voltage bus;
a clock input of the latch is connected to an output of the first AND gate;
a clear and reset input of the latch is connected to an output of the second AND gate;
a first input of the NOR gate is connected to an output of the latch;
a second input of the NOR gate is configured to receive a signal configured to determine a pulse width of the first turn-on pulse of the high-side switch; and
an input of the second inverter is connected to an output of the NOR gate, and wherein:
the enable circuit is configured to generate an enable signal in response to a falling edge of the output signal of the PWM comparator, and wherein in response to the enable signal, the two outputs of the offset current control stage are connected to the two inputs of the PWM comparator; and
in response to the PWM dimming signal, the enable circuit is configured to generate a disable signal, and wherein in response to the disable signal, the two outputs of the offset current control stage are disconnected from the two inputs of the PWM comparator.

11. A system comprising:
a high-side switch and a low-side switch connected in series between an input voltage bus and ground;
an inductor and a current sense resistor connected in series between a common node of the high-side switch and the low-side switch, and an output terminal of the step-down power converter;
an output capacitor connected between the output terminal of the step-down power converter and ground; and
a controller comprising:
an on timer configured to determine an on time of the high-side switch of a step-down power converter;
an offset current control stage configured to convert a voltage difference between a compensation signal and a predetermined reference into a current difference;
a current comparison stage configured to amplify a sensed current signal; and a PWM comparator having inputs coupled to two outputs of the current comparison stage and two outputs of the offset current control stage, wherein during a load transient from a first load level to a second load level and in a first turn-on pulse of the high-side switch, the on timer is disabled so that a current flowing through the step-down power converter reaches the second load level within the first turn-on pulse of the high-side switch, and wherein during the load transient from the first load level to the second load level and in the first turn-on pulse of the high-side switch, the two outputs of the offset current control stage are disconnected from the two inputs of the PWM comparator so that the current flowing through the step-down power converter reaches the second load level within the first turn-on pulse of the high-side switch.

12. The system of claim 11, wherein:

the current comparison stage comprises:

a first amplifier having a non-inverting input connected to a common node of the inductor and the current sense resistor through a first resistor, and an inverting input connected to the output terminal of the step-down power converter through a second resistor;

an adjustable current source connected to the non-inverting input of the first amplifier, and wherein a current flowing through the adjustable current source is proportional to the second load level;

a second amplifier having a non-inverting input connected to a first output of the first amplifier, and an inverting input connected to a second output of the first amplifier;

a third resistor connected between a first output of the second amplifier and an inverting input of the PWM comparator; and a fourth resistor connected between a second output of the second amplifier and a non-inverting input of the PWM comparator; and the offset current control stage comprises:

a third amplifier having a non-inverting input connected to the inverting input of the second amplifier, and an inverting input connected to the non-inverting input of the second amplifier;

a compensation capacitor connected between an output of the third amplifier and ground, and wherein the third amplifier is configured to generate the compensation signal across the compensation capacitor;

a fourth amplifier having a non-inverting input configured to receive the compensation signal, and an inverting input configured to receive a predetermined reference; and a first auxiliary switch and a second auxiliary switch coupled between outputs the fourth amplifier and inputs of the PWM comparator.

* * * * *